Feb. 27, 1962 J. F. BLACK 3,022,658
RADIATOR CAP TESTING DEVICE ACCUMULATOR
Filed Dec. 23, 1957 2 Sheets-Sheet 1

INVENTOR.
JOHN F. BLACK

BY
RICHEY, WATTS, EDGERTON,
McNENNY & FARRINGTON.
ATTORNEYS

Feb. 27, 1962    J. F. BLACK    3,022,658
RADIATOR CAP TESTING DEVICE ACCUMULATOR
Filed Dec. 23, 1957    2 Sheets-Sheet 2

INVENTOR.
JOHN F. BLACK
BY
RICHEY, WATTS, EDGERTON,
McNENNY & FARRINGTON.
ATTORNEYS 3,022,658
RADIATOR CAP TESTING DEVICE
ACCUMULATOR
John F. Black, 307 Morewood Parkway, Cleveland, Ohio
Filed Dec. 23, 1957, Ser. No. 704,704
3 Claims. (Cl. 73—40)

This invention relates to improvements in my copending application, Serial No. 589,766, filed June 6, 1956, now abandoned, entitled "Automobile Cooling System Testing Device" and is a continuation-in-part thereof.

The invention pertains to testing apparatus for automobile cooling systems and the radiator pressure caps therefor.

The object of the invention resides in an accumulator cylinder operatively connected to a testing device having a gauge thereon to indicate the fall in pressure in the event the radiator cap being tested is defective.

Another object of the invention is to provide a testing device for radiator caps which is light in weight, portable, susceptible of ready attachment of the cap, efficient of operation and economic of manufacture, easy and quick to use. Also, since cooling systems are being produced with increasing pressure ratings, this invention facilitates checking such heavier caps which would be difficult to check by means of bulb or hand pump.

Other objects and advantages more or less ancillary to the foregoing, and the manner in which all the various objects are realized, will appear in the following description, which considered in connection with the accompanying drawings, sets forth the preferred embodiment of the invention.

Figure 1:
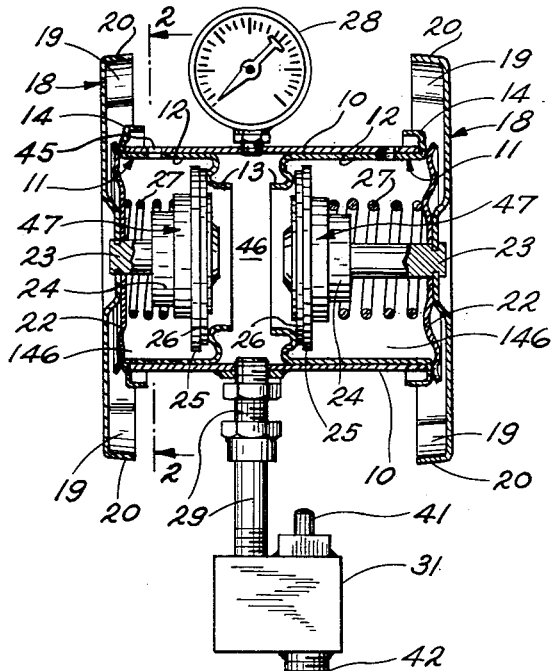
FIG. 1 is a longitudinal sectional view of the testing device and accumulator.
Figure 3:
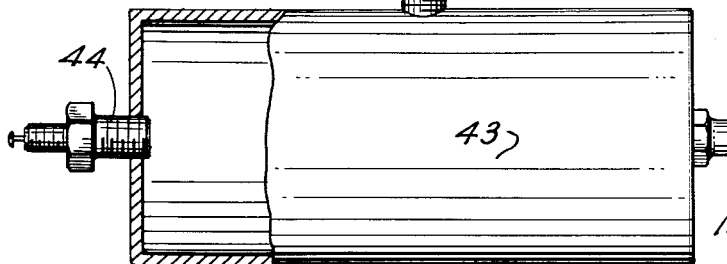
FIG. 3 is a vertical sectional view through the valve for the accumulator.
Figure 3:
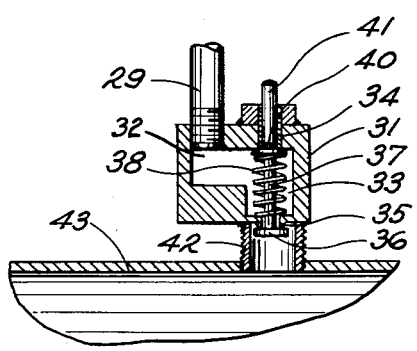
Figure 2:
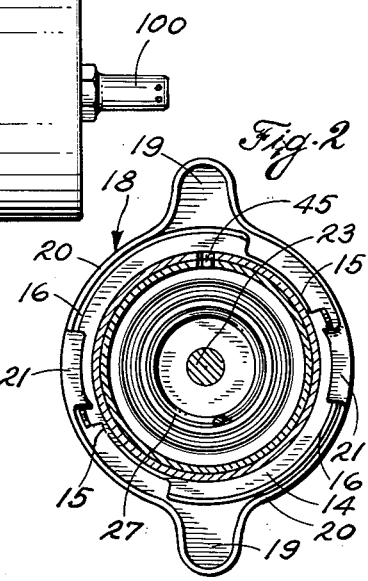
FIG. 2 is a transverse sectional view through the testing unit, the section being taken on a plane indicated by the line 2—2 in FIG. 1.

Referring first to FIG. 1, the apparatus comprises a metallic seamless tube 10 (approximately two (2") long) having radiator filler necks 11 secured in air tight relation in the opposed ends thereof. The filler necks are of the usual form which embody a tubular shank 12, an inturned flange 13 in one end thereof constituting valve seats, and a transversely disposed flange or end wall 14. The end wall is formed with a pair of diametrically opposed notches 15 therein for the reception of radial ears on the radiator cap, and the remaining portion of the end wall is provided with depending flanges formed with inclined cams 16 for drawing the cap into intimate engagement with the end wall 14 of the filler neck. The ends of the cams 16 are formed with depending lugs to limit the rotative movement of the cap as it is revolved over the cams 16 or screwed into locked position with the filler neck.

The radiator caps 18 comprise an annular metal stamping 61 having opposed finger grip lugs 19 thereon and a depending flange 20. The flange is fabricated with inturned ears 21 intermediate the lugs, adapted to enter the notches 15 in the filler neck and engage the cams 16. The inner face of the cap 18 is provided with a spring metal disc 22 engageable with the end wall 14 of the filler neck, and a post 23 slidably engaged with an inverted cup 24. The cup is formed with a flange 25 thereon which is faced with a rubber gasket 26 engageable with the valve seat 13 in the filler neck. The rubber gasket 26 is held in intimate engagement with the seat 13 by a helical spring 27 interposed between the disc 22 and the cup 24. When the cap is in position on the filler neck, tensive effort on the gasket and valve seat is provided by screwing the cap down over the inclined edges of the cams 16. Thus, when radiator caps are disposed in both ends of the tube 10, a chamber 46 is defined between the cups 24, and chambers 146 are defined at each end of the tube 10 between the cups and the ends of the tube.

The pressure radiator caps vary somewhat in depth and are also made with variable spring loading for automobile radiators of different type and make, hence, for the convenience of the user of the testing apparatus, a filler neck to receive the most popular short type cap is secured in one end of the tube 10, while the longer type is mounted in the other end.

Figures 4, 5:
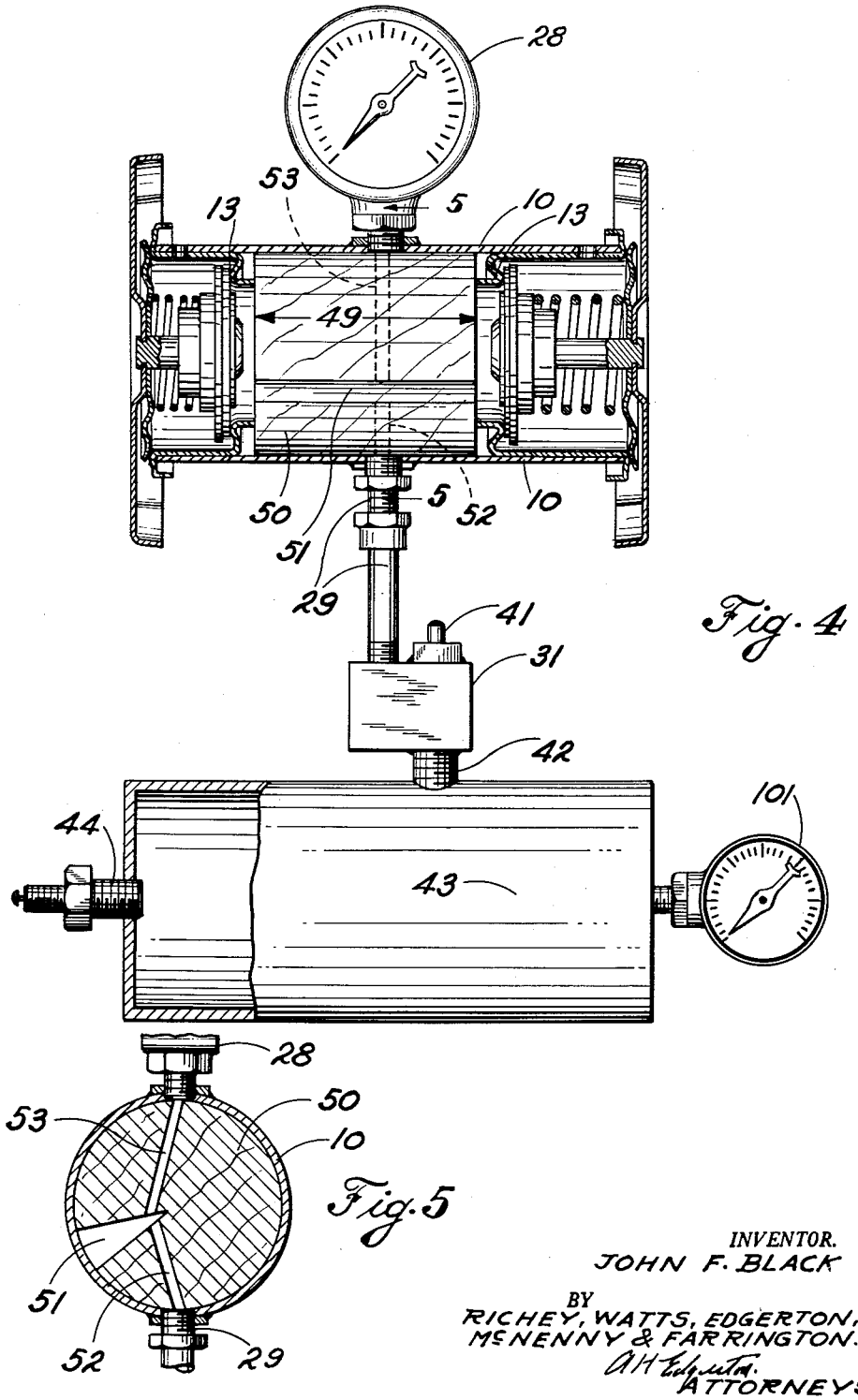
FIG. 4 is a longitudinal section through a testing device of a modified form.
FIG. 5 is a vertical sectional view through the testing device shown in FIG. 4, the section being taken on a plane indicated by the lines 5—5 in FIG. 4.

The central portion of the tube 10 is drilled and tapped to receive the threaded shank of an air gauge 28, and a tube 29 is threaded into a tapped opening in the opposed side thereof. The tube 29 communicates with a valve cage 31 embodying a horizontal cavity 32, an interconnecting counterbore 33 and a bore 34. The counterbore terminates above the base of the valve cage and defines a ledge constituting a valve seat 35 for a poppet valve 36. The valve stem 37 is guided in the bore 34 and a helical spring 38 is mounted on the stem between the inner face of the ledge for the valve seat 35 and a valve stem cross pin 40 to urge the valve into engaged relation with the valve seat. The end 41 of the valve stem protrudes beyond the top of the valve cage so actuation of the valve may be attained by the application of finger pressure thereon. The bottom of the valve cage is connected to a nipple 42 threaded into the wall of a reservoir or accumulator tank 43. The accumulator is provided with a tire valve 44 of conventional form to facilitate the introduction of air under pressure therein. The accumulator is preferably charged by a hose connected to an air compressor that normally delivers one-hundred and fifty pounds (150 lbs.) p.s.i., though other injection means may substitute therefor and are contemplated as falling within the scope of the invention. A safety valve 100 may, if desired, be mounted in the accumulator as a safeguard therefor, as shown in FIGURE 1, and/or an air guage 101 may be employed in the assembly as shown in FIGURE 4.

The tube 10 and the filler necks 11 are cross-drilled adjacent the outer ends thereof to provide openings 45 for the escapement of air within the voids intermediate the valve seats and discs 22.

In operation, the gasoline station attendant or garage mechanic making the test, first removes the cap to be tested from the automobile and inspects the marking thereon that shows the spring load thereof. He then screws the cap being tested on one end of the tube 10 and screws another cap having a heavier spring therein upon the other end of the tube. This cap having the heavier spring therein serves both as a closure device for one end of the tube and a safety valve. He next momentarily depresses the end 41 of the valve stem to release compressed air from the accumulator. Air from the accumulator flows into the chamber 46 under pressure and thus exerts a pressure against both of the valves 47. The weaker of the two springs 27 in the two caps will yield, permitting a passageway from the chamber 46 to one of the chambers 146 to open. The air will pass through the chamber 146 and escape through the opening 45. The air will continue to escape until the pressure has been reduced to such an extent that it is equal to the pressure exterted by the weaker spring 27 at which time the valve 26 will close against the valve seat 13. A pressure gauge 28, which is in communication with the chamber 46, will then show the pressure exerted by the air in the chamber 46 which is in equilibrium with the spring 27 of the valve that had yielded and thus equal to the spring pressure of that cap. If the valve that yielded was the cap used as a relief valve, the operator knows that the cap being tested is not functioning properly in that its spring pressure is greater than that of the relief valve. For this reason the tested valve must require pressure higher than the rated value before it will open, inasmuch as the relief valve was selected as one having a higher value than the rated value of the cap being tested. If the cap being tested is the valve that yielded, then the gauge will indicate the spring pressure of the cap being tested. The operator can then compare that value with the rated value of the cap being tested to determine whether it is proper. The operator then observes the gauge 28 to be sure that there is no leakage occurring around the valve 26 and the valve seat 13. If there is such leakage, the gauge 28 will show a gradual decrease in pressure due to leakage.

When a cap is tested and it is found that the spring pressure is inadequate, a plain rubber washer of a suitable thickness and/or durometer may be inserted between the valve seat 13 in the filler neck and the valve flange 26 to build the spring load to the requisite pressure, and thus avoid the necessity of purchasing a new cap assembly.

In the modified form illustrated in FIG. 4, the tube 10 is longer than the tube illustrated in FIG. 1, but the length of the chamber 49 indicated by the arrows between the filler necks, is filled with a plug 50 made of wood or any other material which is capable of reducing the volumetric capacity of the chamber 49. The plug is formed with a lineal passageway 51 in the cylindrical wall thereof which communicates with the void below the valve seats 13 and additional passageways 52 and 53 leading from the air inlet tube 29 and air gauge 28 respectively communicate therewith to facilitate the operation of the unit. The plug may be made with a clearance around the circumference thereof and the passageways 52 and 53 may then be omitted.

The object of this form of the testing device is to permit the use of a standard cylinder shown in my co-pending application, by merely reducing the volume capacity of the cylinder so as to conserve the air in the accumulator and enable the longer use and operation thereof without recharging.

It has been found in practice, that when the accumulator 43 has been fully charged, about 12 to 15 testing operations may be performed before the air in the accumulator is exhausted.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A testing device for an automobile pressure radiator cap, comprising, a tube having radiator filler necks formed at opposite ends of said tube, each of said filler necks being adapted to receive a spring loaded radiator cap, a radiator cap having a spring tension of a known value removably connected to the radiator filler neck at one end of said tube, said cap being a safety valve and constituting a closure for one end of the tube, an air guage communicating with said tube intermediate the filler necks, an accumulator tank in communication with said tube intermediate the filler necks, and a valve connected to said accumulator for controlling the admission of air into said tube.

2. In combination, a testing device for an automobile pressure radiator cap comprising, a tube having a radiator filler neck formed at each of two opposite ends thereof, each of said filler necks being adapted to receive a spring loaded radiator cap, a radiator cap including a spring of known tension removably connected to one of said filler necks, the mentioned cap being a safety valve and constituting a closure for one end of the tube, an air gauge communicating with said tube intermediate the filler necks, a second radiator cap having a spring of unknown tension connected to the other of said filler necks, said second cap constituting a closure for the other end of said tube, said tube including breathing apertures adjacent each end thereof and exteriorly of a pressure chamber defined by the tube, said filler necks and said radiator caps, said air gauge being in communication with said pressure chamber, and a conduit projecting through an aperture in the tube and sealed to the tube, the conduit being in fluid pressure conducting communication with said pressure chamber.

3. The device of claim 2 wherein each of the filler necks includes an end wall and a valve seat spaced therefrom and wherein each of the radiator caps includes a gasket biased into smooth sealing abutment with the valve seat by the mentioned spring and a spring metal disc engaging the end wall.

References Cited in the file of this patent
UNITED STATES PATENTS

| | | |
|---|---|---|
| 1,118,478 | Dixon | Nov. 24, 1914 |
| 1,706,567 | Dezendorf | Mar. 26, 1929 |
| 2,760,367 | Stromberg | Aug. 28, 1956 |
| 2,847,851 | Enell | Aug. 19, 1958 |
| 2,853,874 | Mennesson | Sept. 30, 1958 |